United States Patent
Champetier

[19]

[11] Patent Number: 6,056,434
[45] Date of Patent: May 2, 2000

[54] APPARATUS AND METHOD FOR DETERMINING THE TEMPERATURE OF OBJECTS IN THERMAL PROCESSING CHAMBERS

[75] Inventor: Robert J. Champetier, Scotts Valley, Calif.

[73] Assignee: Steag RTP Systems, Inc., San Jose, Calif.

[21] Appl. No.: 09/041,536

[22] Filed: Mar. 12, 1998

[51] Int. Cl.[7] .................. G01J 5/00; G01J 5/10; G01N 25/00; H05B 1/00

[52] U.S. Cl. .............. 374/126; 219/497; 219/411; 374/9; 374/128

[58] Field of Search .................. 374/126, 9, 128; 219/497, 411

[56] References Cited

U.S. PATENT DOCUMENTS

| | | | |
|---|---|---|---|
| 3,537,314 | 11/1970 | Suet ........................................ | 374/126 |
| 3,630,085 | 12/1971 | Roney ..................................... | 374/126 |
| 4,465,382 | 8/1984 | Iuchi et al. ............................. | 374/126 |
| 4,511,800 | 4/1985 | Harbeke et al. ...................... | 250/372 |
| 4,649,261 | 3/1987 | Sheets .................................... | 219/411 |
| 4,919,542 | 4/1990 | Nulman et al. . | |
| 4,956,538 | 9/1990 | Moslehi . | |
| 4,969,748 | 11/1990 | Crowley et al. ....................... | 374/126 |
| 4,984,902 | 1/1991 | Crowley et al. ....................... | 374/126 |
| 5,029,117 | 7/1991 | Pattou ..................................... | 374/126 |
| 5,114,242 | 5/1992 | Gat et al. . | |
| 5,154,512 | 10/1992 | Schietinger et al. . | |
| 5,165,796 | 11/1992 | Gat et al. . | |
| 5,188,458 | 2/1993 | Thompson et al. . | |
| 5,226,732 | 7/1993 | Nakos et al. . | |
| 5,249,142 | 9/1993 | Shirakawa et al. . | |
| 5,255,286 | 10/1993 | Moslehi et al. . | |
| 5,271,084 | 12/1993 | Vandenabeele et al. . | |
| 5,305,416 | 4/1994 | Fiory . | |
| 5,308,161 | 5/1994 | Stein . | |
| 5,326,173 | 7/1994 | Evans et al. .......................... | 374/126 |
| 5,442,727 | 8/1995 | Fiory . | |
| 5,443,315 | 8/1995 | Lee et al. . | |
| 5,444,815 | 8/1995 | Lee et al. . | |
| 5,467,220 | 11/1995 | Xu . | |

(List continued on next page.)

FOREIGN PATENT DOCUMENTS

| | | |
|---|---|---|
| 0612862A1 | 8/1994 | European Pat. Off. . |
| 0708318 A1 | 4/1996 | European Pat. Off. . |

OTHER PUBLICATIONS

European Search Report, Jun. 11, 1999, E for EP99104794.

Honda, et al.; New Radiation Thermometry Using Multiple Reflection for Temperature Measurement of Steel Sheets; pp. 923–927; 1992; New York.

Yamamoto, et al.; Radiation Thermometry Method Using Multi–reflection Between Two Parallel Steel sheet Surfaces; pp. 933–938; 1992; New York.

Krapez, et al.; Reflective–cavity Temperature Sensing for Process Control; pp. 877–882; 1992; New York.

Neuer, et al.; Thermal Analysis of the Different Methods of Multiwavelength Pyrometry; pp. 787–789; 1992; New York.

Yamada, et al.; Radiation Thermometry for Simultaneous Measurement of Temperature and Emissivity; pp. 843–847; 1992; New York.

*Primary Examiner*—G. Bradley Bennett
*Assistant Examiner*—Gail Verbitsky
*Attorney, Agent, or Firm*—Dority & Manning, P.A.

[57] ABSTRACT

The present invention is generally directed to a system and process for accurately determining the temperature of an object, such as a semiconductive wafer, by sensing and measuring the object radiation being emitted at a particular wavelength. In particular, a reflective device is placed adjacent to the radiating object, which causes thermal radiation being emitted by the wafer to be reflected multiple times. The reflected thermal radiation is then monitored using a light detector. Additionally, a reflectometer is contained within the system which independently measures the reflectivity of the object. The temperature of the object is then calculated using not only the thermal radiation information but also the information received from the reflectometer.

27 Claims, 2 Drawing Sheets

U.S. PATENT DOCUMENTS

| | | |
|---|---|---|
| 5,624,590 | 4/1997 | Fiory . |
| 5,628,564 | 5/1997 | Nenyei et al. . |
| 5,660,472 | 8/1997 | Peuse et al. . |
| 5,727,017 | 3/1998 | Maurer et al. .......................... 374/126 |
| 5,738,440 | 4/1998 | O'Neil et al. .......................... 374/109 |
| 5,769,540 | 6/1998 | Schietinger et al. .................... 374/127 |
| 5,874,711 | 2/1999 | Champetier et al. ................... 219/497 |

APPARATUS AND METHOD FOR DETERMINING THE TEMPERATURE OF OBJECTS IN THERMAL PROCESSING CHAMBERS

FIELD OF THE INVENTION

The present invention is generally directed to a method and apparatus for measuring the temperature of an object being heated, such as a semiconductor wafer, without contacting the object. More particularly, the temperature of the object is determined by sensing the thermal radiation being emitted by the object and by sensing the reflectivity of the object.

BACKGROUND OF THE INVENTION

The accurate measurement of surface temperatures of hot objects is of concern in many industrial and scientific processes. For instance, temperatures must be accurately measured and controlled during the fabrication of semiconductor devices. In particular, the temperature of semiconductor wafers must be accurately monitored during rapid thermal processing of the wafers, during rapid thermal oxidation of the wafers, or during other processes which modify or add thin chemical films or coatings to the surface of the wafers. For these critical semiconductor fabrication processes, it is essential that the temperature be known within a few degrees over a range which may extend from less than 400° C. to over 1,100° C.

In the past, the temperature of hot objects was determined either using (1) contact methods or (2) non-contact methods. For instance, during contact methods, the hot object is contacted with a sensor such as a thermocouple that is in turn connected to a temperature meter, which indicates the temperature of the object. Conventional non-contact methods of determining temperature, on the other hand, include using a light sensor such as an optical pyrometer that senses the thermal radiation being emitted by the object at a particular wavelength of light. Once the thermal radiation being emitted by the object is known, the temperature of the object can be estimated.

When processing semiconductor materials for use in the electronics industry, it is far preferable to use non-contact methods when measuring the temperature of the semiconductor wafers. For instance, one advantage of non-contact methods is that the wafer can be spun slowly during the heating process, which promotes uniform temperature distribution throughout the wafer. Rotating the wafer also promotes more uniform contact between the flow of processing gases and the wafer. Besides being able to rotate the wafers, another advantage to using non-contact methods is that, since no temperature gauges need be attached to the wafer, the wafers can be processed much more quickly saving precious time during semiconductor fabrication.

For all of the high temperature wafer processes of current and foreseeable interest, one of the more important requirements is that the true temperature of the wafer be determined with high accuracy, repeatability and speed. The ability to accurately measure the temperature of a wafer has a direct payoff in the quality and size of the manufactured semiconductor devices. For instance, the smallest feature size required for a given semiconductor device limits the computing speed of the finished microchip. The feature size in turn is linked to the ability to measure and control the temperature of the device during processing. Thus, there is increasing pressure within the semiconductor industry to develop more accurate temperature measurement and control systems.

In this regard, the chief disadvantage of conventional non-contact optical pyrometry systems for determining temperature is that the systems measure an apparent temperature rather than the true temperature of the wafer. In particular, a real surface emits radiation less efficiently than an ideal or perfect blackbody. Through theory and calculation, once the emitted radiation of a blackbody is known, the temperature of the blackbody can be calculated. A real body, however, such as a wafer, emits only a fraction of the radiation that would be emitted by a blackbody at the same temperature. This fraction is defined as the emissivity of the real object. Thus, when sensing the radiation being emitted by a real body, a pyrometer generally indicates an apparent temperature that is lower than the true temperature of the object.

Thus, in order to measure the true temperature of a real body using a pyrometer, the indicated temperature must be corrected to account for the emissivity. Unfortunately, the emissivity of a real body is generally unknown and is very difficult to measure accurately. Further, the emissivity of semiconductor wafers varies from wafer to wafer. The emissivity is a property of the surface and depends on several parameters, such as the chemical composition of the wafer, the thickness of the wafer, the surface roughness of the wafer, and the wavelength at which the pyrometer operates.

In the past, others have attempted to approximate the emissivity of a semiconductor wafer or to otherwise minimize its impact on temperature measurements using a pyrometer. For instance, one method for approximating the temperature of a silicon wafer using a pyrometer is to first determine the emissivity of the wafer or of a similarly constructed wafer using a temperature thermocouple in a separate process. This method, however, is not efficient. Further, it has been found that the emissivity of silicon wafers, even if they are similarly constructed, can vary widely from wafer to wafer. Additionally, the combination of errors arising from the use of thermocouples can exceed the error budget for the most demanding of wafer processes, such as will be required for the next generation of microchips.

Besides attempting to determine the emissivity of a wafer, other methods attempt to diminish the effect of not knowing the emissivity by using emissivity enhancement techniques. During these techniques, the object is to artificially increase the emissivity of the wafer to a value very close to unity which causes the wafer to simulate a blackbody allowing for more accurate temperature readings. For instance, one known emissity enhancement technique is to place a highly reflective sheet parallel to the semiconductor wafer as disclosed in a published European Patent Application having Publication No. 0612862 entitled: "Measuring Wafer Temperatures" by Gronet et al. and in U.S. Pat. No. 5,226,732 to Nakos et al. which are both incorporated herein by reference.

By placing a reflective sheet next to the wafer, the radiation emitted by the wafer reflects multiple times. The multiple reflections between the wafer and the reflective sheet cause the radiation between the two surfaces to add up and approximate the radiation of a perfect blackbody at the temperature of the wafer. This has the effect of enhancing the emissivity of the wafer to a value close to unity, allowing for more accurate temperature measurements.

For instance, according to Planck's law the radiation emitted by a blackbody at a particular wavelength ($\lambda$) and temperature (T) is as follows:

$$R_{bb} = \left(\frac{C_1}{\lambda^5}\right)\left(\frac{1}{e^{\frac{c_2}{\lambda T}} - 1}\right) \qquad (1)$$

wherein $C_1$ and $C_2$ are well known constants. The radiation emitted by a real surface, such as a wafer, with an emissivity (E), on the other hand, is as follows:

$$R_w = E R_{bb} \qquad (2)$$

When a reflective sheet is placed adjacent to the wafer at a distance that is infinitesimally small, an infinite series of rays are created which have increasing numbers of reflections. A pyrometer sensing the multiple reflections would measure a total radiation emitted by the wafer as follows:

$$R_w = E R_{bb}[1 = \rho_r \rho_w = (\rho_r \rho_w)^2] \qquad (3)$$

wherein $\rho_r$ is the reflectivity of the reflective sheet and $\rho_w$ is the reflectivity of the wafer.

Because the geometric series contained in the brackets above simplifies to $1/(1-\rho_r \rho_w)$ and because, according to Kirchhoff's law $E = 1 - \rho_w$, for an opaque wafer, the radiation emitted by the wafer can be stated as follows:

$$R_w = R_{bb}\left(\frac{1-\rho_w}{1-\rho_r\rho_w}\right) \qquad (4)$$

Finally, if the reflectivity of the reflective sheet ($\rho_r$) is nearly 100%, i.e., 1, then the above equation reduces to $$R_w = R_{bb} \qquad (5)$$

However, if the distance between the wafer and the reflective sheet is increased to several millimeters, as can be necessary in a practical system, the value of the enhanced radiation measured by the pyrometer as described above, is still somewhat dependent on the emissivity of the wafer's surface and on the reflectivity of the reflective sheet. Consequently, the implementation of known emissivity enhancing techniques as described above have good but limited payoffs. As such, a need currently exists for further improvements in noncontact temperature measurement systems.

SUMMARY OF THE INVENTION

The present invention recognizes and addresses the foregoing disadvantages, and others of prior art constructions and methods.

Accordingly, it is an object of the present invention to provide an improved system and process for measuring the temperature of a radiating body without contacting the body.

Another object of the present invention is to provide a method and system for determining the temperature of an object by multiply sensing the thermal radiation emitted by the object at a particular wavelength.

It is another object of the present invention to provide a method and system of determining the temperature of an object by reflecting the thermal radiation being emitted by the object and then measuring the reflected radiation.

Another object of the present invention is to provide a method and system of determining the temperature of an object by not only sensing the thermal radiation being emitted by the object but also by measuring the reflectivity of the object for estimating the true emissivity of the object.

It is another object of the present invention to provide an apparatus for determining the temperature of an object, such as a semiconductor wafer, which includes a radiation sensing device that works in conjunction with a reflectometer.

Still another object of the present invention is to provide a system for processing semiconductor wafers that monitors the temperature of the wafer and, based on temperature determinations, controls the amount of heat supplied to the wafer.

It is another object of the present invention to provide a method and system of determining the temperature of a semiconductor wafer while exposing the wafer to light energy.

These and other objects of the present invention are achieved by providing an apparatus for measuring the temperature of an object. The apparatus includes a chamber adapted to receive an object. A reflective device is contained within the chamber and is positioned so as to be placed adjacent to the object when received within the chamber. The reflective device is configured to reflect thermal radiation being emitted by the object between a surface of the object and a surface of the reflective device. A radiation sensing device senses the thermal radiation being reflected between the reflective device and the surface of the object.

In accordance with the present invention, the apparatus further includes a reflectometer which is configured to determine a reflectivity value for the object. By knowing the reflectivity of the object, the emissivity of the object can be estimated. The reflectivity information received from the reflectometer in combination with the thermal radiation information received from the radiation sensing device can then be used to determine the temperature of the object with improved precision.

In one embodiment, the radiation sensing device which senses the thermal radiation being reflected between the surface of the object and the reflective device can be a pyrometer. Further, in some applications, the apparatus can include a plurality of pyrometers, such as about 6, that measure the thermal radiation being reflected in a plurality of locations. The reflective device used to reflect thermal radiation being emitted by the object can be, for instance, a plate having a highly reflective surface that is placed adjacent to the object. For instance, the reflective device can be made from a substrate that is coated with a highly reflective metal or with a highly reflective dielectric film. In general, the reflective device should have a reflectivity of at least 0.9 at the wavelength of light selected for the operation of the pyrometer.

The reflectometer incorporated into the apparatus of the present invention can include a light source that is configured to emit a predetermined amount of light energy onto a location of the object. A second radiation sensing device similar to the device that is used to sense the thermal radiation being emitted by the object is included within the reflectometer and is positioned so as to detect the amount of the light energy being emitted by the light source that is reflected off the object.

In applications where the surface of the object is rough, the reflectometer can further include a diffuser which scatters the light being emitted by the light source prior to the light contacting the object. By scattering the light, a more accurate determination of the reflectivity of the object is possible. The purpose of the diffuser is to improve the light source by rendering the light from the source more spatially uniform and more directionally diffuse.

The diffuser used in the reflectometer can be, for instance, a transparent planar substrate having at least one rough surface. For instance, the planar substrate can be made from quartz, glass or sapphire. Alternatively, the diffuser can be made from small transparent particles that have been secured together. In a further embodiment, the diffuser can be a planar substrate made from a transparent material that contains microscopic bubbles, which scatter light propagating through the material. Other methods of implementing a suitable diffuse light source are possible, such as by utilizing arrays of microlenses or FRESNEL optical elements.

In order to prevent the reflectometer from interfering with the radiation sensing device which senses the thermal radiation being reflected between the reflective device and the object, in one embodiment, the reflectometer illuminates the object with the predetermined amount of light energy at periodic intervals. In this embodiment, the radiation sensing device can be out of phase with the reflectometer such that the radiation sensing device only senses the thermal radiation being reflected between the object and the reflective device when the light energy that is emitted by the reflectometer is not illuminating the object.

In order to enable the reflectometer to sense preferentially the light emitted by the light source while not detecting the radiation being emitted by the object, which is multiply reflected due to the reflective device, in one embodiment, the light from the light source is modulated or interrupted periodically. The radiation sensing device working with the reflectometer only senses the desired modulated light, thus not sensing the undesired light emitted by the object.

In order for the predetermined amount of light energy to illuminate the object intermittently, the reflectometer can include a light chopping device. The light chopping device can periodically block the light being emitted by the light source from impinging on the object. The chopping device can be, for instance, a rotating plate made from metal or any other suitable material that moves or rotates in and out of the light path emitted by the light source. A vibrating reed chopper is also suitable. Other chopper mechanisms in common use are also suitable. Besides a physical device, however, the light source itself can be configured to only emit light intermittently by using suitable electronic controls.

The apparatus of the present invention, in one embodiment, can be used to monitor the temperature of semiconductor wafers while simultaneously heating the wafers. The apparatus can include, for instance, a heat source in communication with the chamber for heating the wafers contained in the chamber. The heat source can include, for instance, a plurality of lamps which emit thermal light energy. The lamps can be separated from the chamber by a filter which substantially prevents light at a preselected wavelength from entering the chamber. The radiation sensing device, which senses the thermal radiation being emitted by the wafer can operate at the preselected wavelength to limit interference.

The apparatus can also include a controller, such as a microprocessor, which is placed in communication with the radiation sensing device, the reflectometer, and the heat source. The controller can be configured to determine the temperature of the wafer by receiving information from the radiation sensing device and the reflectometer. Based upon the calculated temperature of the wafer, the controller can also be configured to control the amount of heat being emitted by the heat source in order to heat the wafer according to a preprogramed temperature regime.

These and other objects of the present invention are also achieved by providing a method for measuring the temperature of a radiating body. The method includes the steps of reflecting thermal radiation being emitted by the radiating body between a surface of the radiating body and a reflective device. For instance, the reflective device can include a reflective surface which faces the radiating body. The thermal radiation that is reflected between the radiating body and the reflective device is sensed and monitored.

The method further includes the step of illuminating a location on the radiating body with a predetermined amount of light energy that is emitted by a light source. After the light energy contacts the radiating body, the amount of light energy that is reflected off the radiating body is sensed and measured by itself. According to the present invention, the temperature of the radiating body can then be determined using in combination the amount of thermal radiation that is reflected between the radiating body and the reflective device and the reflectivity data that is obtained by measuring the amount of the light energy from the reflectometer that is reflected off the radiating body.

In one embodiment, the radiating body can be heated by a heat source during the heat process. In this embodiment, the heat that is emitted by the heat source can be controlled in response to the calculated temperature of the radiating body.

Other objects, features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
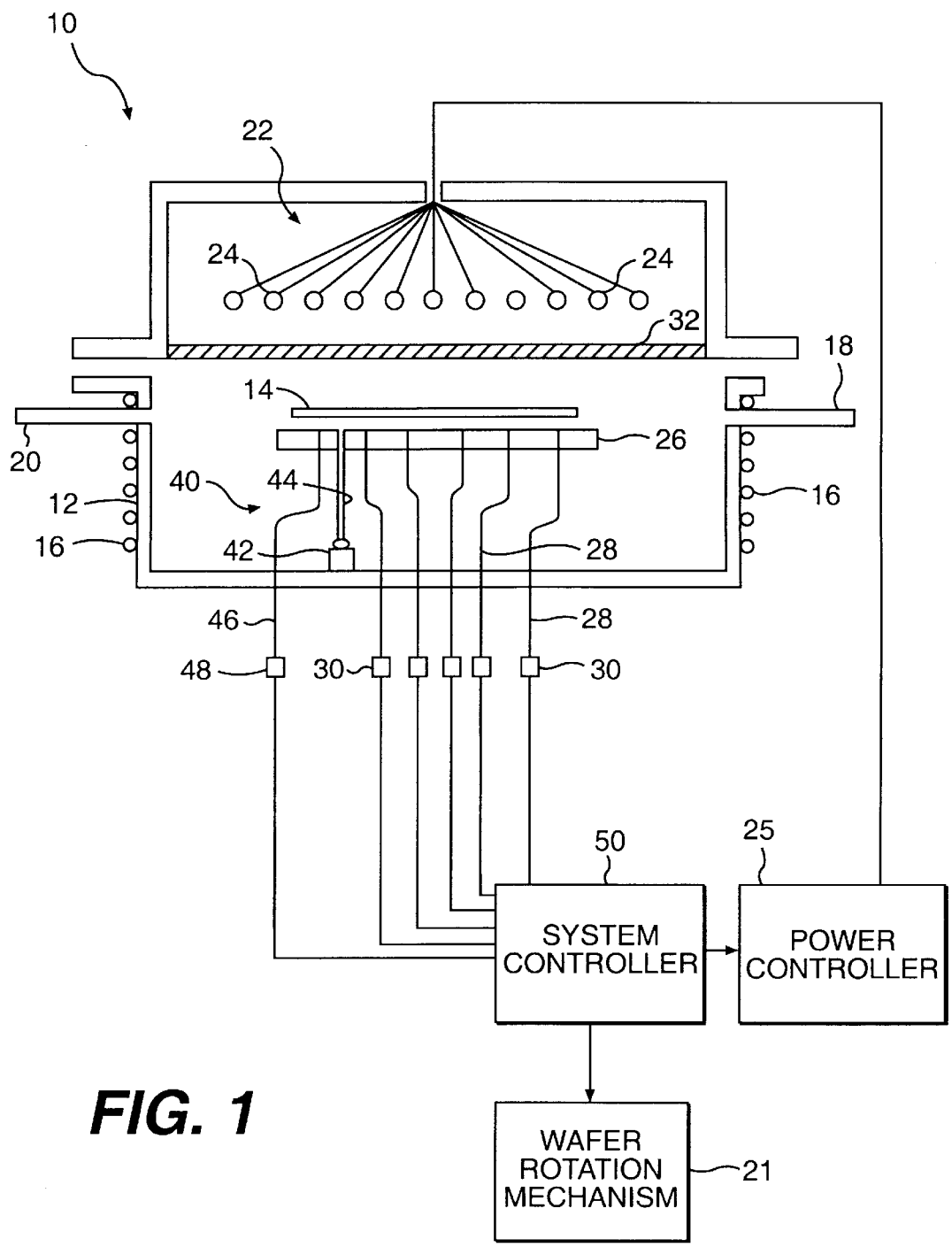
FIG. 1 is a side view of one embodiment of a system for measuring and controlling the temperature of a semiconductor wafer in accordance with the present invention.

Repeat use of references characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

In general, the present invention is directed to a method and to a system for determining and controlling the temperature of a radiating body. It is believed that the principles of the present invention are applicable to a wide variety of processes contained in different fields. In one embodiment, as will be described hereinafter, the present invention is particularly well suited to determining the temperature of wafers made from a semiconductive material. Specifically, the system can be used during heat treatment of the wafers, during oxidation of the wafers, or during other processes which modify or add films to the surface of the wafers.

The present invention is generally directed to calculating the temperature of a wafer or object without contacting the wafer or object. The temperature of the wafer or object is determined according to the present invention by using a combination of data or information that is obtained from two separate devices or techniques. In particular, the apparatus of the present invention includes (1) a system that reflects and measures thermal radiation being emitted by the object and (2) a reflectometer which measures the reflectivity of the object. The present inventor discovered that the information obtained from both of the above techniques can be used to more accurately determine the temperature of the object than if either technique were used alone.

In the first technique, as stated above, thermal radiation being emitted by the object is reflected by placing a reflective device adjacent to the object or wafer. By reflecting the radiation being emitted by the object multiple times, the emissivity of the object is artificially increased or enhanced, which allows for more accurate temperature measurements, especially if the enhanced emissivity takes on a value that is close to unity.

As described above, simply using a reflective device, however, provides results that are dependent on the starting emissivity of the surface of the object, on the reflectivity of the reflective device, on the distance that the reflective device is spaced apart from the object, and on the geometry and dimensions of both the reflective device and the object.

In view of the above limitations, the present invention is further directed to using a reflectometer in combination with the above emissivity enhancement technique. A reflectometer measures the reflectivity of the object ($\rho_w$). The reflectivity of the object is directly related to the emissivity of the object, providing the object is opaque, as follows:

$$E = 1 - \rho_w \qquad (6)$$

Thus, the reflectometer provides a direct and independent determination of the emissivity of the wafer or object.

In accordance with the present invention, both of the above techniques are combined to accurately determine the temperature of the wafer or object. In particular, by combining both of the above techniques, the range of uncertainty in the emissivity and reflectivity of the object are narrowed, which are the two principal variables in calculating the temperature of the object.

Referring to FIG. 1, a system generally 10 made in accordance with the present invention for determining and controlling the temperature of a wafer made from a semiconductive material, such as silicon, is illustrated. System 10 includes a processing chamber 12 adapted to receive substrates such as a wafer 14 for conducting various processes. Chamber 12 is designed to heat wafer 14 at very rapid rates and under carefully controlled conditions. Chamber 12 can be made from various materials, including certain metals, glasses and ceramics. For instance, chamber 12 can be made from stainless steel or quartz.

When chamber 12 is made from a heat conductive material, preferably the chamber includes a cooling system. For instance, as shown in FIG. 1, chamber 12 includes a cooling conduit 16 wrapped around the perimeter of the chamber. Conduit 16 is adapted to circulate a cooling fluid, such as water, which is used to maintain the walls of chamber 12 at a constant temperature.

Chamber 12 can also include a gas inlet 18 and a gas outlet 20 for introducing a gas into the chamber and/or for maintaining the chamber within a preset pressure range. For instance, a gas can be introduced into chamber 12 through gas inlet 18 for reaction with wafer 14. Once processed, the gas can then be evacuated from the chamber using gas outlet 20.

Alternatively, an inert gas can be fed to chamber 12 through gas inlet 18 for preventing any unwanted or undesirable side reactions from occurring within the chamber. In a further embodiment, gas inlet 18 and gas outlet 20 can be used to pressurize chamber 12. A vacuum can also be created in chamber 12 when desired, using gas outlet 20 or an additional larger outlet positioned beneath the level of the wafer.

During processing, chamber 12, in one embodiment, can be adapted to rotate wafer 14 using a wafer rotation mechanism 21. Rotating the wafer promotes greater temperature uniformity over the surface of the wafer and promotes enhanced contact between wafer 14 and any gases introduced into the chamber. It should be understood, however, that besides wafers, chamber 12 is also adapted to process optical parts, films, fibers, ribbons, and other substrates having any particular shape.

A heat source generally 22 is included in communication with chamber 12 for heating wafer 14 during processing. In this embodiment, heat source 22 includes a plurality of lamps 24, such as tungsten-halogen lamps. Heat source 22 can include a reflector or set of reflectors, for carefully directing thermal energy being emitted by the heat source onto wafer 14 so as to produce a very uniform wafer temperature. As shown in FIG. 1, lamps 24 are placed above wafer 14. It should be understood, however, that lamps 24 may be placed at any particular location. Further, additional lamps could be included within system 10 if desired.

The use of lamps 24 as heat source 22 is generally preferred. For instance, lamps have much higher heating and cooling rates than other heating devices, such as electrical elements or conventional furnaces. Lamps 24 create a rapid isothermal processing system that provide instantaneous energy, typically requiring a very short and well controlled start up period. The flow of energy from lamps 24 can also be abruptly stopped at any time. As shown in the figure, lamps 24 are equipped with a gradual power controller 25 that can be used to increase or decrease the thermal energy being emitted by the lamps.

In accordance with the present invention, contained within chamber 12, adjacent to wafer 14, is a reflective device 26. Reflective device 26 is connected to a plurality of optical fibers or light pipes 28 which are, in turn, in communication with a plurality of corresponding light detectors 30. Optical fibers 28 are configured to receive thermal energy being emitted by wafer 14 at a particular wavelength. The amount of sensed radiation is then communicated to light detectors 30 which generate a usable voltage signal for determining the temperature of the wafer. In one embodiment, each optical fiber 28 in combination with a light detector 30 comprises a pyrometer.

In general, reflective device 26 is designed to reflect the thermal radiation being emitted by wafer 14 at the wavelength at which light detectors 30 operate. Reflective device 26 causes the radiation being emitted by wafer 14 to reflect multiple times between a surface of wafer 14 and a surface of reflective device 26. As a result, optical fibers 28 sense more thermal radiation than that which is actually being emitted by the wafer.

During the process of the present invention, system 10 should be designed such that optical fibers 28 only detect thermal radiation being emitted by wafer 14 and not detect radiation being emitted by lamps 24. In this regard, system 10 includes a filter 32 which prevents thermal radiation being emitted by lamps 24 at the wavelength at which light detectors 30 operate from entering chamber 12. Filter 32 as shown in FIG. 1 can be a window positioned between chamber 12 and heat source 22. In an alternative embodiment, each lamp 24 can be covered by a separate filter.

In one embodiment, filter 32 is made from fused silica or quartz. Fused silica is known to absorb thermal radiation very effectively at selected wavelengths. For instance, synthetic fused silica is very effective at absorbing light at a wavelength of from approximately 2.7 micrometers to about 2.8 micrometers. Thus, in one embodiment, when filter 32 is made from synthetic fused silica, light detectors 30 can be configured to detect thermal radiation being emitted by wafer 14 at a wavelength of about 2.7 micrometers.

In order to cool the reflective device during heat treatment of wafer 14, reflective device 26 can include a cooling mechanism. For instance, reflective device 26 can include a hollow cavity through which a cooling fluid, such as water, can be circulated. In some applications, it is necessary to cool reflective device 26 in order to prevent the reflective device from becoming damaged. For instance, if reflective device is made from dielectric materials as will be described in more detail hereinafter, the device should not be heated to temperatures greater than about 400° C. Higher temperatures may also tend to lower the reflectivity of reflective surface 36.

In general, reflective device 26 should be placed as close as possible to wafer 14 in order to increase the amount that the thermal radiation being emitted by the wafer is reflected. Since reflective device 26 is typically at a lower temperature than wafer 14, however, placing the reflective device too close to the wafer may interfere with the heating process or may prevent the wafer from being heated at a uniform rate. The choice of the distance or spacing between wafer 14 and reflective device 26 depends upon the size of wafer 14. For wafers measuring 200 mm in diameter, in general reflective device 26 can be spaced from about 3 mm to about 15 mm from wafer 14. More particularly, for this wafer size, reflective device 26 is typically spaced from wafer 14 a distance of from about 6 mm to about 8 mm. A larger degree of spacing may be preferable for larger wafers.

Reflective device 26 should have a very high reflectivity, preferably greater than 0.9 at the wavelength at which radiation is sampled by optical fibers 28 and light detectors 30. Reflective device 26 can be made from various materials. In one preferred embodiment, a reflective surface is formed by coating a metallic substrate, such as stainless steel, with a dielectric film. The dielectric film can be a multi-layer optical film specially designed to have the appropriate reflectivity at the desired wavelength. Such films are known in the art and can be obtained from Deposition Sciences, Inc. of Santa Rosa, Calif.

Besides dielectric films, the reflective surface can also be made from highly polished metals coated with a clear protective coating, such as a clear dielectric coating. Such metals include gold, silver, and nickel. However, for a particular desired wavelength, metal surfaces are typically not as reflective as the dielectric films described above. Also, the metals may cause contamination within processing chamber 12 when heated to high temperatures.

According to equation four (4) provided above, the following represents the radiation emitted by a wafer when a reflective surface is placed adjacent to the wafer:

$$R_w = R_{bb}\left(\frac{1-\rho_w}{1-\rho_r\rho_w}\right) \quad (7)$$

Reflecting the radiation multiple times artificially increases and enhances the emissivity of the wafer. From the above equation, the expression for the effective (or enhanced) emissivity ($E_{eff}$) is as follows:

$$E_{eff} = \frac{E}{1-\rho_r\rho_w} \quad (8)$$

As shown above, the effective emissivity is dependent upon the true emissivity of the wafer E, the reflectivity of the wafer, and the reflectivity of the reflective device. Also, the above equation represents ideal conditions. Thus, variations can result depending upon process conditions. For instance, the distance that the reflective device is spaced from the wafer influences the results that are obtained.

In general, when using a highly reflective device, for a reasonable assortment of wafers with different emissivities, the effective emissivity calculated above falls within a limited range. The calculated temperature uncertainty of the wafer depends upon this range. For most applications, the temperature uncertainty range is narrow but is not always adequate to meet temperature controls that are required in thermal processing chambers as illustrated in FIG. 1, particularly for the case of the most demanding process requirements now planned for the next few years.

Thus, in accordance with the present invention, the above system for reflecting thermal radiation being emitted by the wafer is used in conjunction with a reflectometer which directly and independently estimates the emissivity of the wafer by measuring its reflectivity. This information can be used in combination with equation 8 above, which further narrows the range of uncertainty in the calculation of the effective emissivity. Narrowing the range of uncertainty in the effective emissivity serves to narrow the range of temperature uncertainty of the wafer. Thus, a more precise temperature calculation is achieved.

Figure 2:
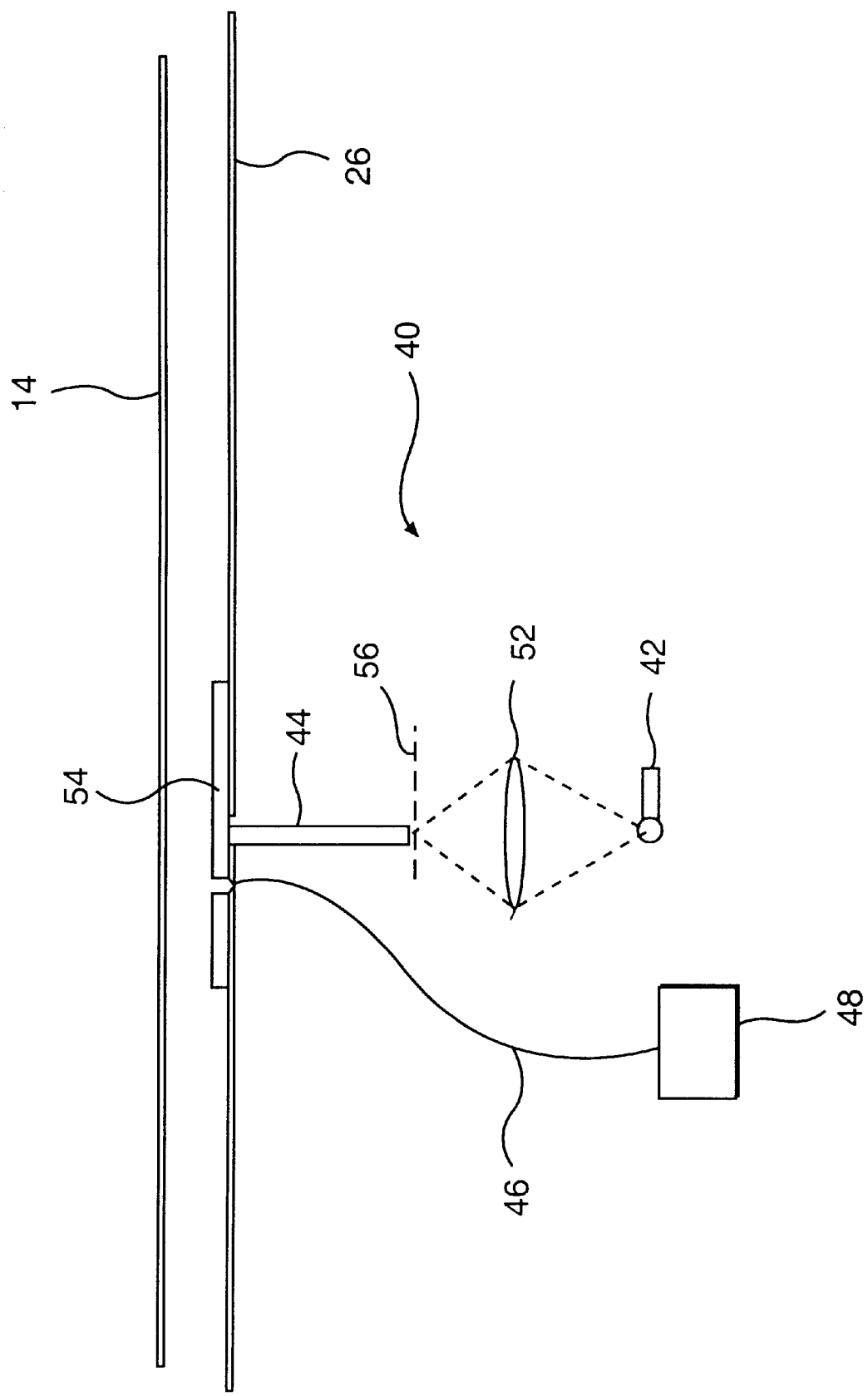
FIG. 2 is a side view of one embodiment of a reflectometer that may be used in accordance with the present invention.

In general, any suitable reflectometer may be used in accordance with the present invention. For instance, reflectometers that may be used in the present invention include those disclosed in U.S. Pat. No. 4,956,538 to Moslehi and U.S. Pat. No. 4,919,542 to Nulman, et al., which are incorporated herein by reference in their entireties. The reflectometer, however, must be capable of being used in conjunction with thermal processing chamber 12 as it is possible for the true emissivity of the wafer to be modified during the thermal and chemical processes occurring within chamber 12. Referring to FIGS. 1 and 2, one embodiment of a reflectometer generally 40 that may be used in the present invention is illustrated. In general, reflectometer 40 includes a light source 42 which emits a predetermined amount of light energy. The light energy is transmitted through a light channel 44. Light channel 44 directs the light energy onto a particular location on wafer 14. A light detector 48 including a light pipe 46 is positioned to sense and measure the amount of the light energy that is reflected off the wafer, which gives the reflectivity of the wafer.

Light source 42 used in the reflectometer can generally be any device that is capable of emitting a determinable amount of light energy. For instance, light source 42 can be an incandescent light bulb, a solid state device such as a laser diode, a light emitting diode, a gas laser, a non-coherent gas source such as an arc lamp, besides various other devices. In the embodiment illustrated in FIG. 2, light source 42 represents a lamp containing an incandescent light bulb. In this embodiment, in order to direct the light energy being emitted by the light source, a focusing lens 52 is included. Focusing lens 52 directs the light being emitted by light source 42 into light channel 44. Light channel 44 can be, for instance, a light pipe made from quartz, glass or sapphire. In general, light channel 44 and focusing lens 52 can be any combination of lens or mirrors and light pipes that control and duct the light for directing the light onto a particular extended area on the wafer.

Once released from light channel 44, the light energy strikes wafer 14 and a proportionate amount of the light energy is reflected, which is detected by light detector 48. Light detector 48, however, only registers an accurate reading when the surface of the wafer is perfectly smooth. Since semiconductor wafers and most other objects are rough, reflectometer 40 further includes a diffuser 54 which compensates for the effects of the roughness of the surface. In general, the function of the diffuser is to scatter the light being emitted by light source 42 and form a uniformly and diffusely irradiated region on the wafer's surface including the location sensed by light detector 48. In other words, the diffuser allows the measurement of the true reflectivity of the wafer by forming an approximately uniform isotropic illumination.

An ideal theoretical diffuser produces a uniform source of diffused light that is traversing in totally random directions with high efficiency and perfect transparency. In the practical embodiment of the present invention, the diffuser need only approximate these ideal features. Thus, the diffuser can be limited in lateral extent instead of being infinite and can be reasonably diffuse instead of perfectly diffuse.

Conventional reflectometers for diffuse samples come in two varieties: those that have a diffusely reflecting but opaque surface, and those that rely on specular optics such as complete concave hemispherical mirrors. In both cases, the reflectometer forms a dome or a sphere around the sample and the light is introduced into the inside of the dome. In the present case, on the other hand, the light is introduced to the outside of the diffuser and the diffuser is flat and transmitting instead of domed and opaque.

Diffuser 54 as shown in FIG. 2 can assume various constructions. Preferably, diffuser 54 is planar, is substantially transparent to the light being emitted by light source 42, but scatters the light in random directions. In one embodiment, diffuser 54 can be a thin sheet of a transparent refractive material such as quartz, glass or sapphire, wherein at least one surface of the sheet and preferably both surfaces of the sheet have been roughened.

In an alternative embodiment, diffuser 54 can be a layer of material made from small transparent and discrete particles which scatter light at the working wavelength. The small discrete particles can be made from, for instance, quartz, glass, sapphire, or non-crystalline aluminum oxide.

In a further alternative embodiment, diffuser 54 can be a sheet of transparent material containing many small microscopic bubbles which serve to scatter the light. Again, in this embodiment, the diffuser can be made from quartz, glass, or sapphire.

Alternatively, diffuser 54 can be a holographic device. A holographic device can be used to control the phase of the light for controlling where the light is directed.

In still another embodiment of the present invention, diffuser 54 can be made from different layers of materials in which each layer represents one of the above three embodiments. In still a further alternative design, the reflectometer can include more than one light source, more than one type of diffuser, and more than one light detector for possibly further increasing the accuracy of the reflectivity measurements.

Besides compensating for the roughness of the wafer's surface, the reflectometer of the present invention must also be capable of measuring the reflectivity of the wafer without receiving interference from thermal radiation being emitted by the wafer itself at the desired wavelength. In order to discern the light being emitted by light source 42 from thermal radiation being emitted by the wafer, in one embodiment, the reflectometer can be configured to work intermittently and out of phase with light detectors 30. For instance, light source 42 can be designed to flash intermittently for shining light on wafer 14 at periodic intervals. Light detector 48 can, in turn, be synchronized with light source 42 so as to only take a reading when light is being reflected off the wafer.

In this embodiment, light detectors 30 shown in FIG. 1 can further be configured to be out of phase with light source 42. In other words, light detectors 30 can be designed to only take measurements when light source 42 is not emitting light onto the wafer. In this manner, light detectors 30 do not measure any interference which may result from light being emitted from light source 42. Additionally, radiation measurements sensed by light detectors 30 can be subtracted from radiation measurements detected by light detector 48 which would eliminate any radiation being emitted by the wafer that is detected by light detector 48 and would provide a reading corresponding only to the reflectivity of the wafer.

As stated above, in one embodiment, light source 42 can be equipped with electronic controls for flashing intermittently. In an alternative embodiment, however, as shown in FIG. 2, reflectometer 40 can include a light chopping device 56. In this embodiment, light source 42 can emit a continuous signal. Light chopping device 56, however, can block the signal and permit transmission to wafer 14 at periodic intervals. Light chopping device 56 can be, for instance, a plate made from a metal or other suitable material that moves in and out of the path of the light energy that is being emitted by light source 42. For example, light chopping device 56 can be a rotating wheel containing holes or openings for allowing periodic transmission of the light. Alternative methods include the use of vibrating tuning fork choppers or metal plates moved by means of an electromechanical device such as an electromagnet or liquid crystal windows and other methods in use in optical laboratories.

Referring to FIG. 1, system 10 further includes a system controller 50 which can be, for instance, a microprocessor. Controller 50 receives voltage signals from light detectors 30 that represent the radiation amounts being sampled at the various locations. Controller 50 also receives signals from light detector 48 of reflectometer 40. Based on the signals received, controller 50 is configured to calculate the temperature of wafer 14 based on the above mathematical relationships.

System controller 50 as shown in FIG. 1 can also be in communication with lamp power controller 25. In this arrangement, controller 50 can calculate the temperature of wafer 14, and, based on the calculated information, control the amount of thermal energy being emitted by lamps 24. In this manner, instantaneous adjustments can be made regarding the conditions within reactor 12 for processing wafer 14 within carefully controlled limits.

In one embodiment, controller 50 can also be used to automatically control other elements within the system. For instance, controller 50 can be used to control the flow rate of gases entering chamber 12 through gas inlet 18. As shown, controller 50 can further be used to control the rate at which wafer 14 is rotated within the chamber.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An apparatus for measuring the temperature of an object comprising:
   a chamber adapted to receive an object;
   a reflective device contained within said chamber, said reflective device being configured to reflect thermal radiation being emitted by said object between a surface of said object and said reflective device;
   a radiation sensing device for sensing said emitted and reflected thermal radiation between the object and the reflective device, said reflective device being positioned adjacent to said object in a manner that artificially enhances the emissivity of the object;
   a reflectometer configured to determine a reflectivity value for said object; and
   a controller configured to receive information from said radiation sensing device and said reflectometer for determining the temperature of said object, said controller being configured to determine the temperature of the object by combining information received from said radiation sensing device and said reflectometer in a mathematical relationship.

2. An apparatus as defined in claim 1, further comprising a heat source in communication with said chamber for heating objects contained within said chamber, said heat source comprising at least one lamp.

3. An apparatus as defined in claim 2, further comprising a filter positioned between said heat source and said chamber for substantially preventing light at a preselected wavelength from entering said chamber, said radiation sensing device sensing said reflected thermal radiation within said chamber at said preselected wavelength.

4. An apparatus as defined in claim 2, wherein said controller is in communication with said heat source, wherein, based on said determined temperature, said controller is configured to control the amount of heat being emitted by said heat source.

5. An apparatus as defined in claim 1, wherein said radiation sensing device comprises a pyrometer.

6. An apparatus as defined in claim 1, wherein said apparatus includes a plurality of radiation sensing devices for sensing thermal radiation being reflected by said reflective device.

7. An apparatus as defined in claim 1, wherein said chamber is adapted to heat said object for a heat cycle and wherein said controller is configured to determine the temperature of the object during the entire heat cycle.

8. An apparatus as defined in claim 1, wherein said reflectometer comprises:
   a light source configured to emit a predetermined amount of light energy onto a location on said object;
   a diffuser in communication with said light energy being emitted by said light source, said diffuser scattering said light energy prior to said light energy impinging on said location on said object; and
   a radiation sensing device configured to detect the amount of said light energy being reflected off said object.

9. An apparatus as defined in claim 8, wherein said reflectometer is configured such that said predetermined amount of light energy illuminates said location on said object intermittently.

10. An apparatus for measuring the temperature of a semiconductor wafer comprising:
    a chamber adapted to receive said semiconductor wafers;
    a heat source in communication with said chamber for heating said semiconductor wafer when contained therein;
    a reflective device contained within said chamber, said reflective device being configured to reflect thermal radiation being emitted by said semiconductor wafer between a surface of said wafer and said reflective device;
    a radiation sensing device for sensing said emitted and reflected thermal radiation between the object and the reflective device, said reflective device being positioned adjacent to said object in a manner that artificially enhances the emissivity of the object;
    a reflectometer configured to determine a reflectivity value for said semiconductor wafer; and
    a controller configured to receive information from said radiation sensing device and said reflectometer for determining the temperature of said semiconductor wafer, said controller being configured to determine the temperature of the object by combining information received from said radiation sensing device and said reflectometer in a mathematical relationship.

11. An apparatus as defined in claim 10, wherein said radiation sensing device comprises a pyrometer.

12. An apparatus as defined in claim 10, wherein said apparatus includes a plurality of radiation sensing devices for sensing said thermal radiation, said radiation sensing devices comprising pyrometers.

13. An apparatus as defined in claim 10, wherein said controller is in communication with said heat source and wherein, based on said temperature determined by said controller, said controller is further configured to control the amount of heat being emitted by said heat source.

14. An apparatus as defined in claim 10, wherein said reflectometer comprises:
    a light source configured to emit a predetermined amount of light energy onto a location on said object;
    a diffuser in communication with said light energy being emitted by said light source, said diffuser scattering said light energy prior to said light energy impinging on said location on said object; and
    a radiation sensing device configured to detect the amount of said light energy being reflected off said object.

15. An apparatus as defined in claim 14, wherein said diffuser comprises a planar substrate made from a material selected from the group consisting of quartz, glass and sapphire, said planar substrate having at least one rough surface.

16. An apparatus as defined in claim 14, wherein said diffuser comprises a planar substrate, said planar substrate being made from a plurality of discrete particles fused together.

17. An apparatus as defined in claim 14, wherein said diffuser comprises a planar substrate made from a transparent material containing a plurality of bubbles.

18. An apparatus as defined in claim 10, wherein said reflectometer is configured such that said predetermined amount of light energy being emitted by said light source illuminates said location on said semiconductor wafer at periodic intervals, and wherein said radiation sensing device that senses thermal radiation between said reflective device and said surface of said wafer is out of phase with said reflectometer such that said radiation sensing device only senses thermal radiation when said predetermined amount of light energy being emitted by said light source is not illuminating said semiconductor wafer.

19. An apparatus as defined in claim 18, wherein said reflectometer further comprises a light chopping device placed in communication with the path of said light energy being emitted by said light source, said light chopping device intermittently blocking said light energy from illuminating said semiconductor wafer.

20. An apparatus as defined in claim 10, wherein said chamber is adapted to heat said object for a heat cycle and wherein said controller is configured to determine the temperature of the object during the entire heat cycle.

21. A method for measuring the temperature of a radiating body comprising the steps of:

providing a radiating body;

reflecting thermal radiation being emitted by said radiating body between a surface of said radiating body and a reflective device in a manner that artificially enhances the emissivity of the radiating body;

sensing the thermal radiation being reflected between said surface of said radiating body and said reflective device;

illuminating a location on said radiating body with a predetermined amount of light energy being emitted by a light source;

sensing the amount of said light energy that is reflected off said radiating body for producing a reflectivity value for said radiating body; and determining the temperature of said radiating body using a controller from the amount of thermal radiation being sensed between said surface of said radiating body and said reflective device and from said reflectivity value, said temperature being determined by combining the amount of thermal radiation and the reflectivity value in a mathematical relationship.

22. A method as defined in claim 21, further comprising the step of scattering said predetermined amount of said light energy prior to illuminating said light energy with said radiating body.

23. A method as defined in claim 21, wherein said reflective device has a reflectivity of at least 0.9.

24. A method as defined in claim 21, wherein said thermal radiation being reflected between said surface of said radiating body and said reflective device is sensed by a pyrometer, and wherein said reflectivity value for said radiating body is determined by a reflectometer.

25. A method as defined in claim 21, further comprising the step of heating said radiating body with a heat source while determining the temperature of said radiating body.

26. A method as defined in claim 25, wherein the amount of heat being emitted by said heat source is controlled based on the temperature that is determined for said radiating body.

27. A method as defined in claim 21, wherein said location on said radiating body is illuminated with said predetermined amount of light energy at periodic intervals and wherein said thermal radiation being reflected between said surface of said radiating body and said reflective device is only sensed when said radiating body is not being contacted by said predetermined amount of light energy.

* * * * *